United States Patent
Nishanov et al.

(10) Patent No.: US 6,662,219 B1
(45) Date of Patent: Dec. 9, 2003

(54) SYSTEM FOR DETERMINING AT SUBGROUP OF NODES RELATIVE WEIGHT TO REPRESENT CLUSTER BY OBTAINING EXCLUSIVE POSSESSION OF QUORUM RESOURCE

(75) Inventors: Gor Nishanov, Redmond, WA (US); Glenn R. Peterson, Kenmore, WA (US); Rod Gamache, Issaquah, WA (US); Michael T. Massa, Seattle, WA (US); Sunita Shrivastava, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/464,738

(22) Filed: Dec. 15, 1999

(51) Int. Cl.[7] .............................................. G06F 15/16
(52) U.S. Cl. ...................... 709/220; 709/226; 709/209
(58) Field of Search .................................. 709/226, 203, 709/216, 218, 220, 241, 249, 209; 455/446

(56) References Cited

U.S. PATENT DOCUMENTS

| | | |
|---|---|---|
| 5,280,627 A | 1/1994 | Flaherty et al. |
| 5,404,527 A | 4/1995 | Irwin et al. |
| 5,553,239 A | 9/1996 | Heath et al. |
| 5,555,375 A * | 9/1996 | Sudama et al. ............. 709/226 |
| 5,659,748 A | 8/1997 | Kennedy |
| 5,673,384 A | 9/1997 | Hepner et al. |
| 5,727,206 A | 3/1998 | Fish et al. |
| 5,754,821 A | 5/1998 | Cripe et al. |
| 5,781,910 A | 7/1998 | Gostanian et al. |
| 5,828,876 A | 10/1998 | Fish et al. |
| 5,828,889 A | 10/1998 | Moiin et al. |
| 5,828,961 A * | 10/1998 | Subramamian et al. ..... 455/446 |
| 5,835,784 A | 11/1998 | Gillespie et al. |
| 5,892,913 A | 4/1999 | Adiga et al. |
| 5,893,086 A | 4/1999 | Schmuck et al. |
| 5,909,540 A | 6/1999 | Carter et al. |

(List continued on next page.)

FOREIGN PATENT DOCUMENTS

| | | |
|---|---|---|
| EP | 0 760 503 | 3/1997 |
| EP | 0 887 731 | 12/1998 |

OTHER PUBLICATIONS

Distributed clustering for ad hoc networks, Stefano Basagni, 1999, I–span, pp. 310–315.*
On the impossiblity of group membership, Chandra et al, Jan. 1996, Inria.*
Sun Cluster Architecture: A white paper, Dec. 1999, IEEE, pp. 331–338.*

(List continued on next page.)

*Primary Examiner*—Krisna Lim
(74) *Attorney, Agent, or Firm*—Law Offices of Albert S. Michalik, PLLC (57) ABSTRACT

A method and system wherein following a partitioning of a server cluster, operational subgroups arbitrate for possession of a quorum resource that determines cluster representation, wherein the arbitration is biased by a relative weight of the subgroup. The weight may be relative to the original cluster weight, or submitted as a bid that is relative to other possible subgroup weights. The biasing gives subgroups that are better capable of representing the cluster an arbitration advantage over lesser subgroups. The biasing weight of each subgroup may be determined by node count and/or by a calculation of the subgroup's resources. The arbitration may be delayed based on the relative weight, or alternatively, the arbitration may comprise a bidding process in which a subgroup's bid is based on the subgroup's relative weight.

25 Claims, 8 Drawing Sheets

U.S. PATENT DOCUMENTS

| | | | |
|---|---|---|---|
| 5,917,998 | A | 6/1999 | Cabrera et al. |
| 5,918,229 | A | 6/1999 | Davis et al. |
| 5,927,050 | A | 7/1999 | Houck et al. |
| 5,940,838 | A | 8/1999 | Schmuck et al. |
| 5,946,686 | A | 8/1999 | Schmuck et al. |
| 5,948,109 | A | 9/1999 | Moiin et al. |
| 5,974,547 | A | 10/1999 | Klimenko |
| 5,996,075 | A | 11/1999 | Matena |
| 5,999,712 | A * | 12/1999 | Moiin et al. ............... 709/220 |
| 5,999,978 | A * | 12/1999 | Angal et al. ............... 709/229 |
| 6,014,669 | A * | 1/2000 | Slaughter et al. ............ 707/10 |
| 6,108,699 | A * | 8/2000 | Moiin ....................... 709/221 |
| 6,108,781 | A | 8/2000 | Jayakumar |
| 6,192,401 | B1 * | 2/2001 | Modiri et al. ............... 709/220 |
| 6,301,462 | B1 | 10/2001 | Freeman et al. |
| 6,311,217 | B1 * | 10/2001 | Ehlinger et al. ............ 709/226 |
| 6,314,526 | B1 * | 11/2001 | Arendt et al. .................. 714/4 |
| 6,360,331 | B2 | 3/2002 | Vert et al. |
| 6,363,495 | B1 * | 3/2002 | MacKenzie et al. ........... 714/4 |
| 6,427,163 | B1 * | 7/2002 | Arendt et al. ............... 709/201 |
| 6,438,705 | B1 * | 8/2002 | Chao et al. .................... 714/4 |
| 2001/0014097 | A1 * | 8/2001 | Beck et al. ................. 370/401 |

OTHER PUBLICATIONS

Multidimensional Voting: a geneal method for implementing synchronization in distributed systems, Cheung et al, 1990, jpages 362–369.*

Distributed and mobility–adaptive clustering for multimedia support in multi–hop wireless networks, Basagni, 1999, IEEE, 889–893.*

"Sun™ Cluster 2.2," Sun Microsystems, Inc., http://www.sun.com/software/solaris/ds/ds–suncluster/index.html, printed Oct. 26, 1999.

Carr, Richard, "The Tandem Global Update Protocol," *Tandem Systems Review*, vol. 1, No. 2, pp. 74–85 (Jun. 1995).

Gifford, David K., "Weighted Voting for Replicated Data," ACM, pp. 150–159 (1979).

Lamport, Leslie, *A Fast Mutual Exclusion Algorithm*, Digital Equipment Corporation (Nov. 14, 1985).

Lamport, Leslie, *The Part–Time Parliament*, Digital Equipment Corporation (Sep. 1, 1989).

Vogels et al., "The Design and Architecture of the Microsoft Cluster Service," *Proceedings of FTCS '98*, http://www.cs.cornell.edu/rdc/mscs/ftcs28/ (Jun. 23–25, 1998), printed Jul. 25, 2000.

* cited by examiner

| | | Number of Active Nodes Before Regroup | | | | | | |
|---|---|---|---|---|---|---|---|---|
| | | *2* | *3* | *4* | *5* | *6* | *7* | *8* |
| Number of Active Nodes After Regroup | *8* | 0 | 0 | 0 | 0 | 0 | 0 | 0 |
| | *7* | 0 | 0 | 0 | 0 | 0 | 0 | 0 |
| | *6* | 0 | 0 | 0 | 0 | 0 | 0 | 0 |
| | *5* | 0 | 0 | 0 | 0 | 0 | 0 | 0 |
| | *4* | 0 | 0 | 0 | 0 | 0 | 0 | 0 |
| | *3* | 0 | 0 | 0 | 0 | 0 | 1 | 1 |
| | *2* | 0 | 0 | 0 | 1 | 1 | 2 | 2 |
| | *1* | 0 | 1 | 1 | 2 | 2 | 3 | 3 |

SYSTEM FOR DETERMINING AT SUBGROUP OF NODES RELATIVE WEIGHT TO REPRESENT CLUSTER BY OBTAINING EXCLUSIVE POSSESSION OF QUORUM RESOURCE

FIELD OF THE INVENTION

The invention relates generally to computer network servers, and more particularly to computer servers arranged in a server cluster.

BACKGROUND OF THE INVENTION

A server cluster ordinarily comprises a group of at least two independent servers connected by one or more networks and utilized as a single system. The clustering of servers provides a number of benefits over independent servers. One important benefit is that cluster software, which is run on each of the servers in a cluster, automatically detects application failures or the failure of another server in the cluster. Upon detection of such failures, failed applications and the like can be terminated and restarted on a surviving server.

Other benefits of clusters include the ability for administrators to inspect the status of cluster resources, and accordingly balance workloads among different servers in the cluster to improve performance. Such manageability also provides administrators with the ability to update one server in a cluster without taking important data and applications offline for the duration of the maintenance activity. As can be appreciated, server clusters are used in critical database management, file and intranet data sharing, messaging, general business applications and the like.

When operating a server cluster, the cluster operational data (i.e., state) of any prior incarnation of a cluster needs to be known to the subsequent incarnation of a cluster, otherwise critical data may be lost. For example, if a bank's financial transaction data are recorded in one cluster, but a new cluster starts up without the previous cluster's operational data, the financial transactions may be lost. To avoid this, prior clustering technology required that each server (node) possess its own replica of the cluster operational data on a private storage thereof, and that a majority of possible nodes (along with their private storage devices) of a cluster be operational in order to start and maintain a cluster. This ensured that at least one node in any given set of nodes in a cluster was common to any previous cluster and thus the cluster had at least one copy of the correct cluster operational data. Further, the majority (quorum) requirement ensures that only one incarnation of the cluster exists at any point in time, e.g., two non-communicating subsets of the cluster membership cannot form two different instances of the cluster at the same time.

However, requiring a quorum of nodes in order to have a cluster has the drawback that a majority of the possible nodes of a cluster has to be operational in order to have a cluster. A recent improvement described in U.S. patent application Ser. No. 08/963,050, U.S. Pat. No. 6,279,032 issued on Aug. 21, 2001 entitled "Method and System for Quorum Resource Arbitration in a Server Cluster," assigned to the same assignee and hereby incorporated by reference herein in its entirety, provides the cluster operational data on a single quorum resource, typically a storage device, for which cluster nodes arbitrate for exclusive possession. Because the correct cluster operational data is on the quorum resource, a cluster may be formed as long as a node of that cluster has exclusive possession of the quorum resource.

Also, this ensures that only one unique incarnation of a cluster can exist at any given time, since only one node can exclusively possess the quorum resource. The single quorum resource solution increases cluster availability, since at a minimum, only one node and the quorum resource are needed to have an operational cluster.

Another improvement is described in U.S. patent application Ser. No. 09/277,450, now U.S. Pat. No. 6,401,120 issued on Jun. 4, 2002 entitled "Method and System for Consistent Cluster Operational Data in a Server Cluster Using a Quorum of Replicas," assigned to the same assignee and hereby incorporated by reference herein in its entirety. In this improvement, the quorum resource is not limited to a single resource, but rather is comprised of multiple replica members, and a cluster may be formed and continue to operate as long as one server node possesses a quorum (majority) of the replica members. In addition to increasing availability by requiring only one operational node to have a cluster, this increases reliability, since the quorum resource is replicated on a number of devices, whereby a single (e.g., disk) failure will not shut down the cluster.

In clustering technology, a problem sometimes arises when cluster nodes lose their ability to communicate with other cluster nodes, e.g., due to a communications failure or some other type of failure such as the crash of a node. When this occurs, the original cluster is partitioned into two or more subgroups of nodes, in which each subgroup cannot communicate with each other subgroup. Because there is no ability to communicate, a subgroup has no knowledge of the existence of other subgroups, e.g., whether a non-communicating node (or nodes) is a failed node or is operational but is in a subgroup that is isolated by a communications break. When a cluster is partitioned by the loss of communication with one or more nodes, the nodes in each operational subgroup run a protocol to determine which nodes are part of that subgroup.

In order to allow the cluster to continue operating following such a partitioning, one, but only one of the subgroups needs to survive to represent the cluster, while other subgroups (if any) should halt operation and then attempt to rejoin the surviving subgroup. Formerly, this required a majority of the original (pre-partitioned) number of nodes, so it was simple for a subgroup to essentially count its nodes and determine whether it had enough to continue as the cluster. However, when using exclusive possession of a quorum resource as a tie-breaking mechanism to determine representation of the cluster, a majority of nodes is not a requirement. As a result, one or more subgroups may be capable of representing the cluster. For example, if the partition was caused by the failure of some nodes, only one subgroup may be operational, and thus that subgroup should attempt to represent the cluster. At other times, a partitioning may result in multiple subgroups remaining operational, each of which is capable of representing the cluster, even though only one subgroup is allowed to survive. In the case of multiple subgroups remaining operational, one subgroup may be preferred over the others as the choice to be the surviving subgroup, for example, because the preferred subgroup contains more nodes. Alternately, several operational subgroups may be equally desirable candidates to survive. Because the subgroups are unable to communicate with one another, they cannot directly agree on which subgroup is the preferred choice to survive to represent the cluster.

SUMMARY OF THE INVENTION

Briefly, the present invention provides a method and system wherein following a partitioning of a cluster, each operational subgroup makes an attempt (via an elected leader node therein) to secure possession of the quorum resource that determines cluster representation, wherein the attempt is biased by a relative weight of the subgroup. The weight may be relative to the original cluster weight, or submitted as a bid that is relative to other possible subgroup weights. This ensures that every operational subgroup makes an attempt to represent the cluster, while at the same time enabling a subgroup that is better capable of representing the cluster to do so over lesser subgroups.

In one implementation, the biasing weight is determined solely by node count. Each subgroup's attempt to secure possession of the cluster resource is then delayed based on the number of nodes in the subgroup relative to the original cluster number, i.e., the more nodes in a subgroup, the shorter that subgroup's elected leader node delays before attempting to secure possession of (arbitrate for) the quorum resource. In this manner, the subgroup with the largest number of nodes will (ordinarily) survive to represent the cluster, since in general, the more nodes in a cluster, the "better" the cluster. Also, the delay time of a "guaranteed" best subgroup (e.g. one containing a majority of the cluster nodes) is preferably zero to expedite its representation of the cluster.

In other implementations, the relative weight of the cluster may be determined by other criterion or criteria, which may include the number of nodes, and/or the subgroup's resources, such as the subgroup's non-volatile storage space, processing power, random access memory, and so forth. Each of the criteria may be weighted differently. Also, the attempt may be biased in another way, such as by having each subgroup submit a bid based on its relative weight to an entity with which the subgroups can communicate (generally the quorum resource itself) that selects an arbitration winner based on the bid.

Other advantages will become apparent from the following detailed description when taken in conjunction with the drawings.

DETAILED DESCRIPTION OF THE PREFERRED EMBODIMENT

Exemplary Operating Environment

Figure 1:
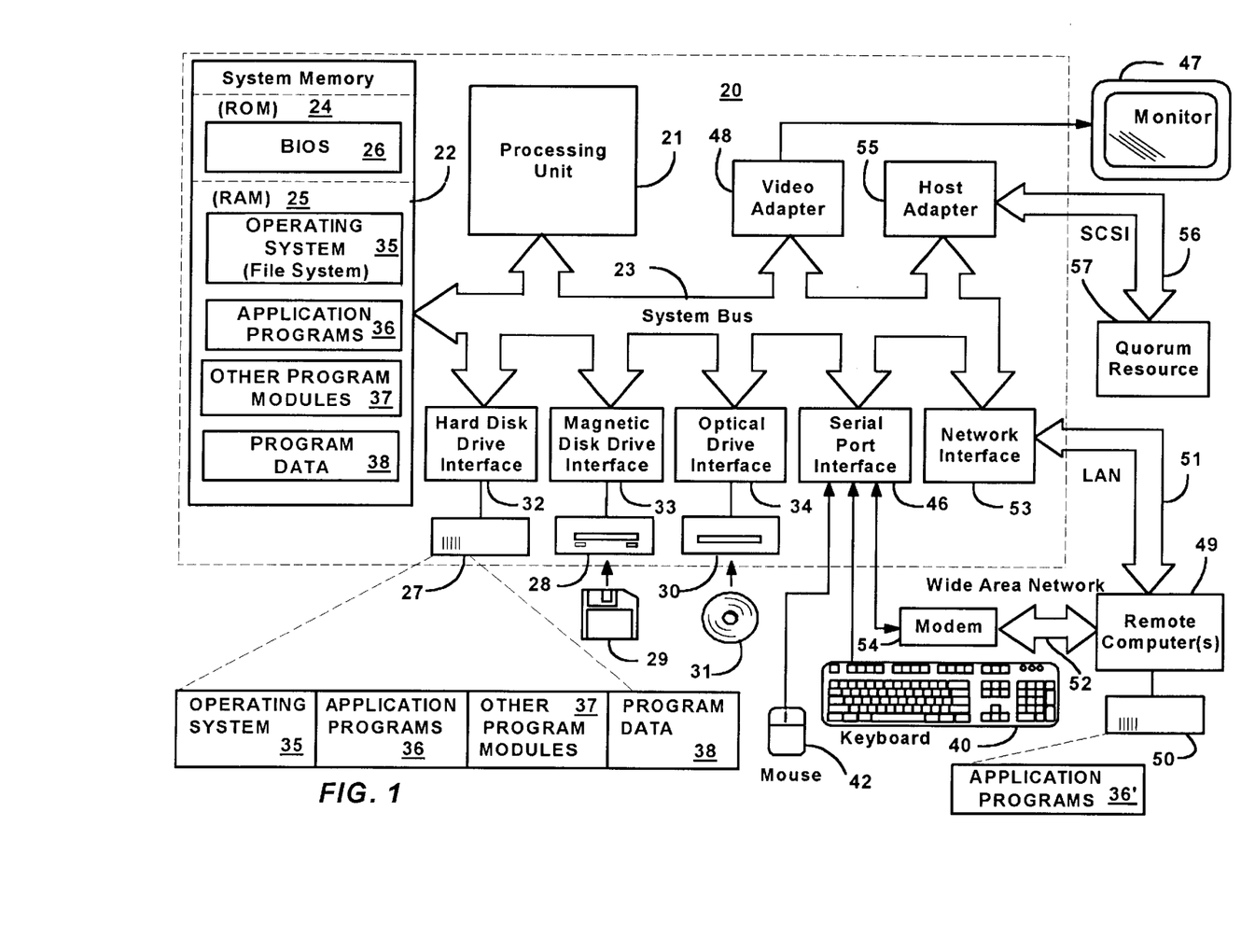
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like acting as a node (i.e., system) in a clustering environment. The computer 20 includes a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (which may be considered as including or operatively connected to a file system), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 operates in a networked environment using logical connections to one or more remote computers 49. At least one such remote computer 49 is another system of a cluster communicating with the personal computer system 20 over the networked connection. Other remote computers 49 may be another personal computer such as a client computer, a server, a router, a network PC, a peer device or other common network system, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet. The computer system 20 may also be connected to system area networks (SANS, not shown). Other mechanisms suitable for connecting computers to form a cluster include direct connections such as over a serial or parallel cable, as well as wireless connections. When used in a LAN networking environment, as is typical for connecting systems of a cluster, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The preferred system 20 further includes a host adapter 55 or the like which connects the system bus 23 to a SCSI (Small Computer Systems Interface) bus 56 for communicating with a quorum resource 57 comprising one or more independent, shared persistent memory storage devices. Other ways of connecting cluster systems to storage devices, including Fibre Channel, are equivalent. Indeed, one alternative way to connect storage devices is via a network connection, as described in U.S. patent application Ser. No. 09/260,194 now U.S. Pat. No. 6,549,934 issued on Apr. 15, 2003 entitled "Method and System for Remote Access of Computer Devices," assigned to the assignee of the present invention and hereby incorporated by reference in its entirety.

As used herein, the "quorum resource" is any tie-breaking mechanism, such as a highly reliable storage mechanism that stores cluster operational data, possession of which determines representation of the cluster. The quorum resource 57 may be a single storage device, or a plurality of replica members, such as described in the aforementioned U.S. patent application Ser. No. 08/963,050 now U.S. Pat. No. 6,279,032 issued on Aug. 27, 2001 and Ser. No. 09/277,450 now U.S. Pat. No. 6,451,100 issued on Jun. 4, 2002 respectively. In any event, the quorum resource 57 is not private to any specific node, but rather is able to be utilized by any node of the cluster at various times, i.e., the quorum resource 57 can operate in a cluster 58 (FIG. 2) regardless of which node or nodes are in that particular incarnation thereof.

Cluster Service Components

Figure 2:
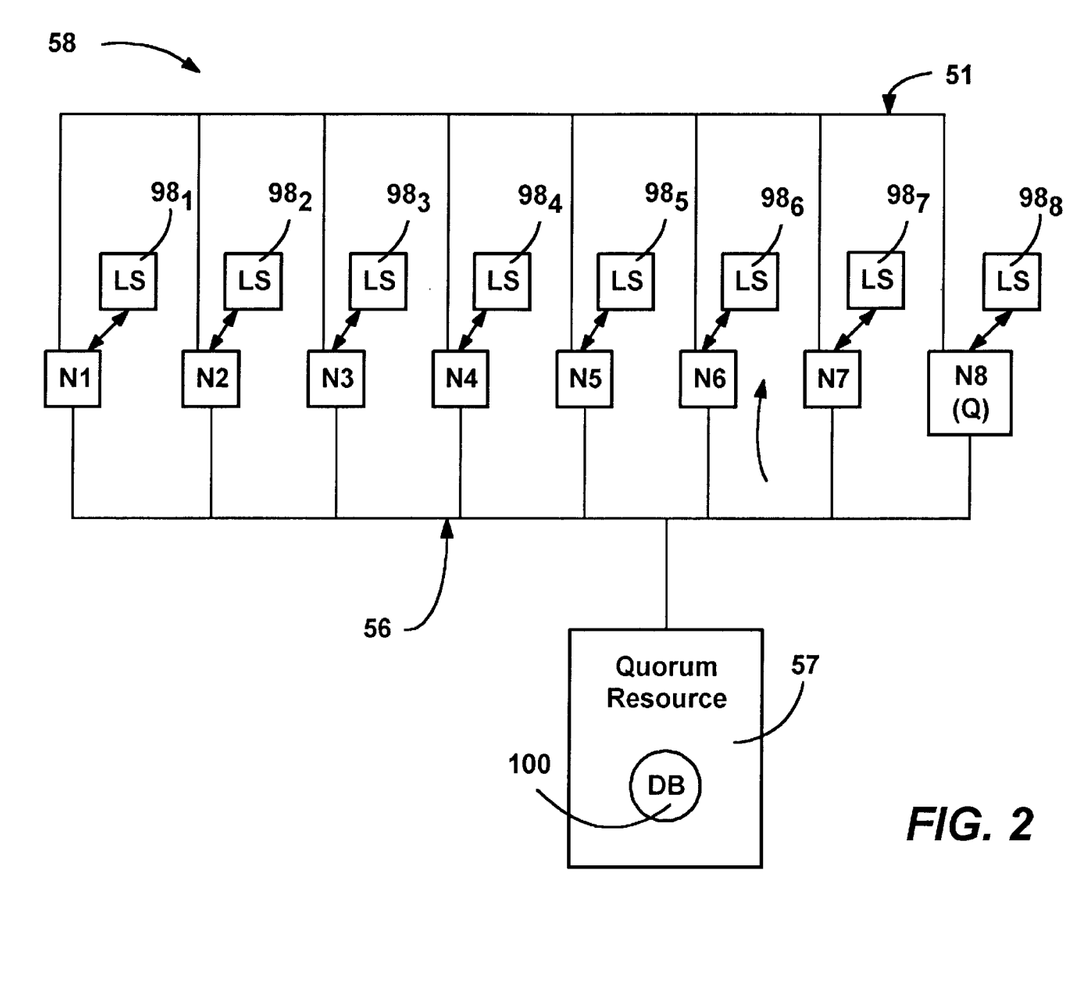
FIG. 2 is a block diagram representing a server cluster prior to being partitioned into subgroups of nodes (FIG. 4)
Figure 3:
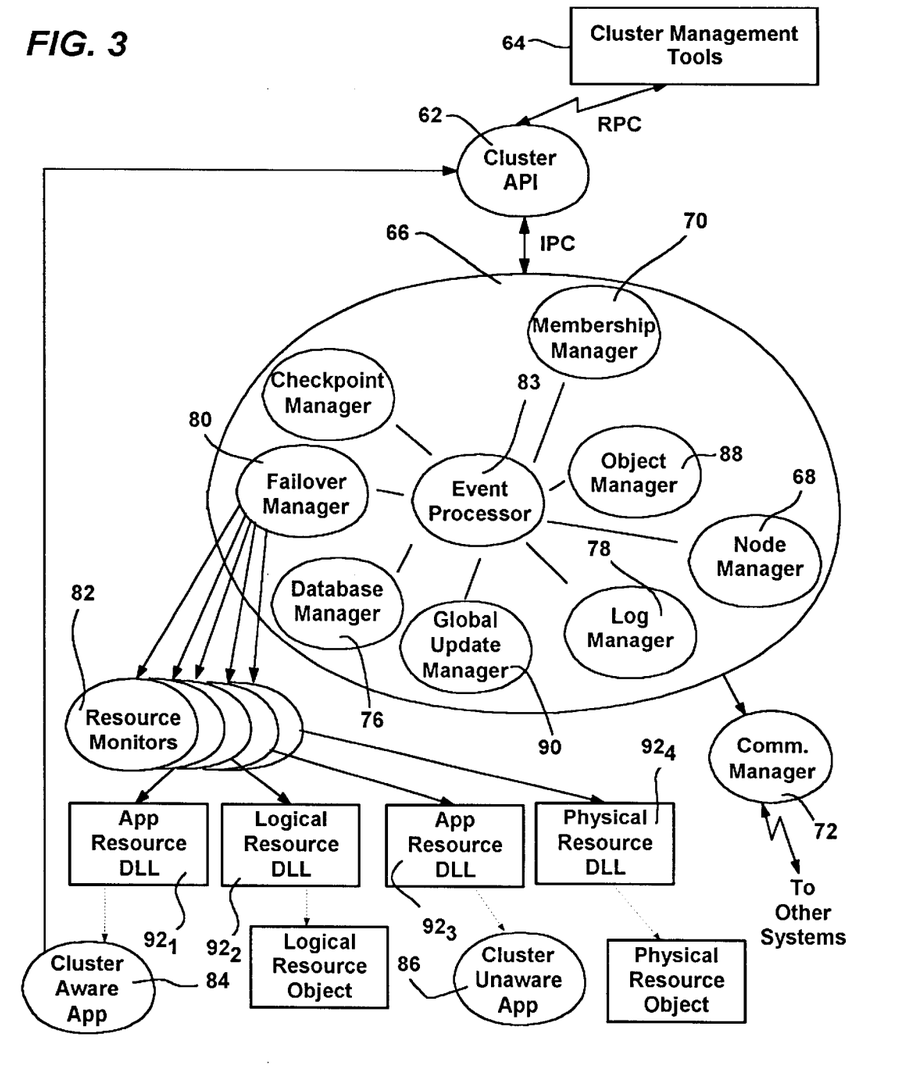
FIG. 3 is a representation of various components within the clustering service of a machine.

FIG. 3 provides a representation of cluster service components and their general relationships in each of the nodes N1–N8 of a cluster 58 (FIG. 2). Note that although eight nodes N1–N8 are shown in the cluster 58 of FIG. 2, a given cluster essentially may have any number of nodes. As represented in FIG. 3, to accomplish cluster creation and to perform other administration of cluster resources, nodes, and the cluster itself, a cluster application programming interface (API) 62 is provided. Applications and cluster management administration tools 64 call various interfaces in the API 62 using remote procedure invocations through RPC (Remote Procedure Calls) or DCOM (Distributed Component Object Model), whether running in the cluster or on an external system. The various interfaces of the API 62 may be considered as being categorized by their association with a particular cluster component, i.e., nodes, resources and the cluster itself.

An administrator typically works with groups, each group being a collection of resources (e.g., cluster application resources, network names, network addresses and so forth) organized to allow an administrator to combine resources into larger logical units and manage them as a unit. Group operations performed on a group affect all resources contained within that group. Usually a group contains all of the elements needed to run a specific application, and for client systems to connect to the service provided by the application. For example, a group may include an application that depends on a network name, which in turn depends on an Internet Protocol (IP) address, all of which are collected in a single group. In a preferred arrangement, the dependencies of all resources in the group are maintained in a directed acyclic graph, known as a dependency tree. Dependency trees are described in more detail in U.S. patent application Ser. No. 08/963,049 entitled "Method and System for Resource Monitoring of Disparate Resources in a Server Cluster," assigned to the same assignee as the present invention and hereby incorporated by reference herein in its entirety.

A cluster service 66 controls the cluster operation on a server cluster 58 (e.g., FIG. 2), and is preferably implemented as a Windows NT® service. The cluster service 66 includes a node manager 68, which manages node configuration information and network configuration information (e.g., the paths between nodes N1–N8). The node manager 68 operates in conjunction with a membership manager 70, which runs the protocols that determine what cluster membership is when a change (e.g., node failure) occurs. A communications manager 72 (kernel driver) manages communications with other nodes of the cluster 58 via one or more network paths. The communications manager 72 sends periodic messages, called heartbeats, to counterpart components on the other nodes of the cluster 58 to provide a mechanism for detecting that the communications path is good and that the other nodes are operational. Through the communications manager 72, the cluster service 66 is essentially in constant communication with the other nodes N1–N8 of the cluster 58. In a small cluster, communication is fully connected, i.e., all nodes of the cluster 58 are in direct communication with all other nodes. In a large cluster, direct communication may not be possible or desirable for performance reasons.

Nodes N1–N8 in the cluster 58 have the same view of cluster membership, and in the event that one node detects a communication failure with another node, the detecting node broadcasts a message to nodes of the cluster 58 causing other members to verify their view of the current cluster membership. This is known as a regroup event, during which writes to potentially shared devices are disabled until the membership has stabilized. If a node does not respond, it is removed from the cluster 58 and its active groups are failed over ("pulled") to one or more active nodes. Note that the failure of the cluster service 66 also causes its locally managed resources to fail.

The cluster service 66 also includes a configuration database manager 76 which implements the functions that maintain a cluster configuration database on local storage devices $98_1$–$98_8$ (FIG. 2) such as a disk and/or memory, and configuration database 100 (FIG. 2) on the quorum resource 57. Note that if the quorum resource 57 comprises a plurality of replica members, each current replica member has a copy of the database 100. The database 100 maintains cluster operational data, i.e., information about the physical and logical entities in the cluster 58. In one embodiment, the cluster operational data may be split into core boot data and cluster configuration data, maintained in two cluster databases, as described in U.S. patent application Ser. No., 09/277,503 now U.S. Pat. No. 6,453,420 issued on Sep. 17, 2002 entitled "Data Distribution in a Server Cluster," assigned to the same assignee as the present invention, and incorporated by reference herein. As described therein, the core-boot data is stored in a database maintained on the quorum resource 57, while the cluster configuration data is stored in a database on a higher performance/lower cost storage mechanism such as a mirror set of storage elements having their status recorded with the core-boot data. However, in such an embodiment, the cluster software views the mirror set storage as a single storage device and is generally not cognizant of the replication (which is maintained at a lower level). Thus, the cluster configuration information is viewed by the cluster software as a single database with a single log. Further, note that both persistent and volatile information may be used to track the current and desired state of the cluster 58, e.g., a copy of one or both of the databases may reside on each node. The database manager 76 may cooperate with counterpart database managers of nodes in the cluster 58 to maintain certain cluster information consistently across the cluster 58. Global updates may be used to ensure the consistency of the cluster database in the quorum resource 57 and each of the nodes N1–N8.

A logging manager 78 provides a facility that works with the database manager 76 of the cluster service 66 to maintain cluster state information across a situation in which a cluster shuts down and a new cluster is later formed with no nodes necessarily being common to the previous cluster, known as a temporal partition. The logging manager 78 operates with the log file, e.g. maintained in the quorum resource 57, to unroll logged state changes when forming a new cluster following a temporal partition.

A failover manager 80 makes resource/group management decisions and initiates appropriate actions, such as startup, restart and failover. The failover manager 80 is responsible for stopping and starting the node's resources, managing resource dependencies, and for initiating failover of groups. The failover manager 80 receives resource and node state information from at least one resource monitor 82 and the node manager 68, for example, to make decisions about groups. The failover manager 80 is responsible for deciding which nodes in the cluster 58 should "own" which groups. Those nodes that own individual groups turn control of the resources within the group over to their respective failover managers 80.

An event processor 83 connects the components of the cluster service 66 via an event notification mechanism. The event processor 83 propagates events to and from cluster-aware applications (e.g., 84) and to and from the components within the cluster service 66. An object manager 88 maintains various cluster objects. A global update manager 90 operates to provide a global, atomic and consistent update service that is used by other components within the cluster service 66. The global update protocol (GLUP.) is used by the global update manager 90 to broadcast updates to each node N1–N8 in the cluster 58. GLUP generally comprises a standard global update message format, state information maintained in each node, and a set of rules that specify how global update should be processed and what steps should be taken when failures occur.

In general, according to the GLUP protocol, one node serves as a "locker" node. The locker node ensures that only one global update is in progress at any given time. With GLUP, a node wishing to send an update to other nodes first sends a request to the locker node. When any preceding updates are complete, the locker node gives permission for this "sender" node to broadcast its update to the other nodes in the cluster 58. In accordance with GLUP, the sender node sends the updates, one at a time, to the other nodes in a predetermined GLUP order that is ordinarily based on a unique number assigned to each node. GLUP can be utilized to replicate data to the machines of a cluster 58, including at least some of the cluster operational data. A more detailed discussion of the GLUP protocol is described in the publication entitled "Tandem Systems Review" Volume 1, Number 2, June, 1985 pp. 74–84, which is incorporated by reference herein in its entirety.

A resource monitor 82 runs in one or more processes that may be part of the cluster service 66, but are shown herein as being separate from the cluster service 66 and communicating therewith via RPC or the like. The resource monitor 82 monitors the health of one or more resources (e.g., $92_1$–$92_4$) via callbacks thereto. The monitoring and general operation of resources is described in more detail in the aforementioned U.S. patent application Ser. No. 08/963,049 now U.S. Pat. No. 6,178,529 issued on Jan. 23, 2001.

The resources (e.g., $92_1$–$92_4$) are implemented as one or more Dynamically Linked Libraries (DLLs) loaded into the address space of the Resource Monitor 82. For example, resource DLLs may include physical disk, logical volume (consisting of one or more physical disks), file and print shares, network addresses and names, generic service or application, and Internet Server service DLLs. Certain resources (e.g., provided by a single source) may be run in a single process, while other resources may be run in at least one other process. The resources $92_1$–$92_4$ run in the system account and are considered privileged code. Resources $92_1$–$92_4$ may be defined to run in separate processes, created by the cluster service 66 when creating resources.

Resources expose interfaces and properties to the cluster service 66, and may depend on other resources, with no circular dependencies allowed. If a resource does depend on other resources, the resource is brought online after the resources on which it depends are already online, and is taken offline before those resources. Moreover, each resource has an associated list of nodes in the cluster 58 on which this resource may execute. For example, a disk resource may only be hosted on nodes that are physically connected to the disk. Also associated with each resource is a local restart policy, defining the desired action in the event that the resource cannot function on the current node.

The nodes N1–N8 in the cluster 58 need to maintain a consistent view of time. One of the nodes, known as the time source and selected by the administrator, includes a resource that implements the time service. Note that the time service, which maintains consistent time within the cluster 58, is implemented as a resource rather than as part of the cluster service 66 itself.

From the point of view of other nodes in the cluster 58 and management interfaces, nodes in the cluster 58 may be in one of three distinct states, offline, online or paused. These states are visible to other nodes in the cluster 58, and thus may be considered the state of the cluster service 66. When offline, a node is not a fully active member of the cluster 58. The node and its cluster service 66 may or may not be running. When online, a node is a fully active member of the cluster 58, and honors cluster database updates, maintains heartbeats, and can own and run groups. Lastly, a paused node is a fully active member of the cluster 58, and thus honors cluster database updates and maintains heartbeats. Online and paused are treated as equivalent states by most of the cluster software, however, a node that is in the paused state cannot honor requests to take ownership of groups. The paused state is provided to allow certain maintenance to be performed.

Note that after initialization is complete, the external state of the node is offline. To join a cluster 58, following the restart of a node, the cluster service 66 is started automatically. The node configures and mounts local, non-shared devices. Cluster-wide devices are left offline while booting, because they may be in use by another node. The node tries to communicate over the network with the last known members of the cluster 58. When the node discovers any member of the cluster 58, it performs an authentication sequence wherein the existing cluster node authenticates the newcomer and returns a status of success if authenticated, or fails the request if not. For example, if a node is not recognized as a member or its credentials are invalid, then the request to join the cluster 58 is refused. If successful, the newcomer may be sent an updated copy of the shared database or databases. The joining node may use the one or more databases to find shared resources and to bring them online as needed, and also to find other cluster members. If a cluster is not found during the discovery process, a node will attempt to form its own cluster, by acquiring control of a quorum of the replica devices in accordance with one aspect of the present invention, as described below.

Once online, a node can have groups thereon. A group can be "owned" by only one node at a time, and the individual resources within a group are present on the node that currently owns the group. As a result, at any given instant, different resources within the same group cannot be owned by different nodes across the cluster 58. Groups can be failed over or moved from one node to another as atomic units. Each group has a cluster-wide policy associated therewith comprising an ordered list of owners. A group fails over to nodes in the listed order.

For example, if a resource (e.g., an application) fails, the failover manager 80 may choose to restart the resource, or to take the resource offline along with any resources dependent thereon. If the failover manager 80 takes the resource offline, the group is restarted on another node in the cluster 58, known as pushing the group to another node. A cluster administrator may also manually initiate such a group transfer. Both situations are similar, except that resources are gracefully shutdown for a manually initiated failover, while they are forcefully shut down in the failure case.

When an entire node in the cluster 58 fails, its groups are pulled from the failed node to another node. This process is similar to pushing a group, but without the shutdown phase on the failed node. To determine what groups were running on the failed node, the nodes maintain group information on each node of the cluster 58 in a database to track which nodes own which groups. To determine which node should take ownership of which groups, those nodes capable of hosting the groups negotiate among themselves for ownership, based on node capabilities, current load, application feedback and/or the group's node preference list. Once negotiation of a group is complete, all members of the cluster 58 update their databases to properly reflect which nodes own which groups.

When a previously failed node comes back online, the failover manager 80 decides whether to move some groups back to that node, in an action referred to as failback. To automatically failback, groups require a defined preferred owner. There may be an ordered list of preferred owners in a cluster of more than two nodes. Groups for which the newly online node is the preferred owner are pushed from the current owner to the new node. Protection, in the form of a timing window, is included to control when the failback occurs.

Subgroup Selection

Figure 4:
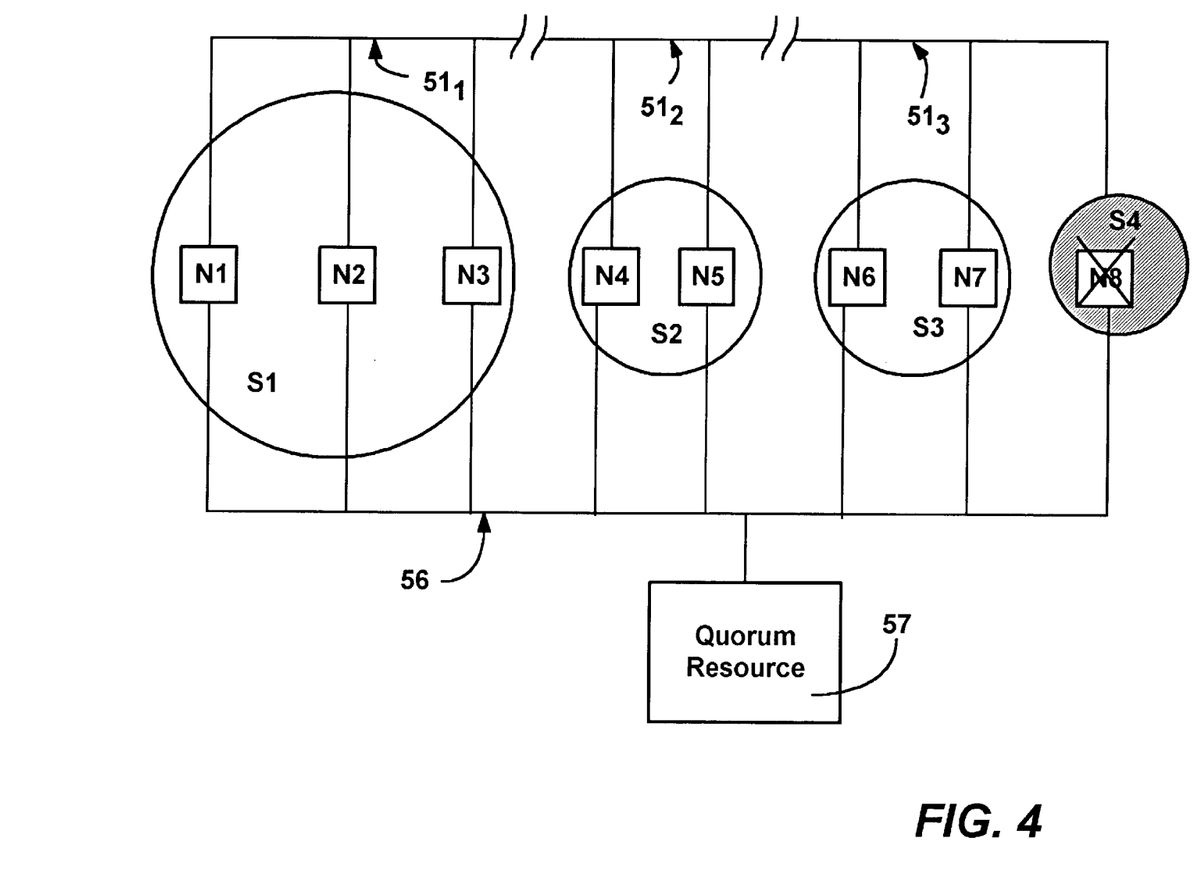
FIG. 4 is a block diagram representing a server cluster partitioned into subgroups that may arbitrate for possession of a quorum resource, in accordance with one aspect of the present invention.

As represented in FIG. 4, a cluster may be partitioned into one or more subgroups of nodes. (e.g. S1–S4), wherein the subgroups are not capable of communicating with one another. Often, such a partition is a result of a communications failure in the LAN communications link 51, such as shown via the breaks in the link between subgroups S1, S2 and S3 in FIG. 4 that result in separate LAN communications links $51_1$–$51_3$. At other times, nodes may fail, which to other subgroups may not be distinguishable from a communications break, i.e., nodes in operational subgroups do not know the reason that they can no longer communicate with a node or nodes not in their subgroup. In FIG. 4, the node N8 in subgroup S4 has failed, as represented by the diagonal lines crossing-out the node N8. Note, however, although the LAN communication link 51 has breaks therein, the operational nodes (and thus the subgroups thereof) are still connected to the quorum resource 57 via the bus 56. As described above, a regroup event occurs whenever one or more nodes are unable to communicate with other nodes of the cluster.

In accordance with one aspect of the present invention, following such a partitioning and the subsequent regroup event, each operational subgroup attempts to secure possession of the quorum resource 57 in order to represent the cluster. The attempt is made by each operational subgroup because subgroups of nodes have no way of communicating with any other subgroups, and thus cannot rely on the existence of another subgroup to represent the cluster.

To make an attempt to possess the quorum resource, each operational subgroup first elects a leader node, provided at least one node therein is capable of representing the subgroup. At present, election is simply choosing the node with the highest (or alternatively the lowest) identifier (ID), since each node in a cluster has a unique ID. If no node is capable of being a leader, the subgroup halts operation, and its nodes will attempt to join an existing cluster (until successful or a timeout occurs).

If a leader node (e.g., the node N1 of subgroup S1) is elected, the leader node will vie for possession of the quorum resource 57 against the leader node of each other operational subgroup, if any, such as the node N4 of the subgroup S2 and the node N6 of the subgroup S3.

In accordance with one aspect of the present invention, each leader node biases its attempt to secure possession of the quorum resource based on the weight of its subgroup. In one implementation, the biasing is accomplished by calculating a delay time (which may be zero) in each leader node, after which the node makes its attempt. In an alternative implementation, each node submits some value based on its subgroup weight to a bid evaluation process, which then selects the subgroup with best bid from those relative weights.

Figure 7:
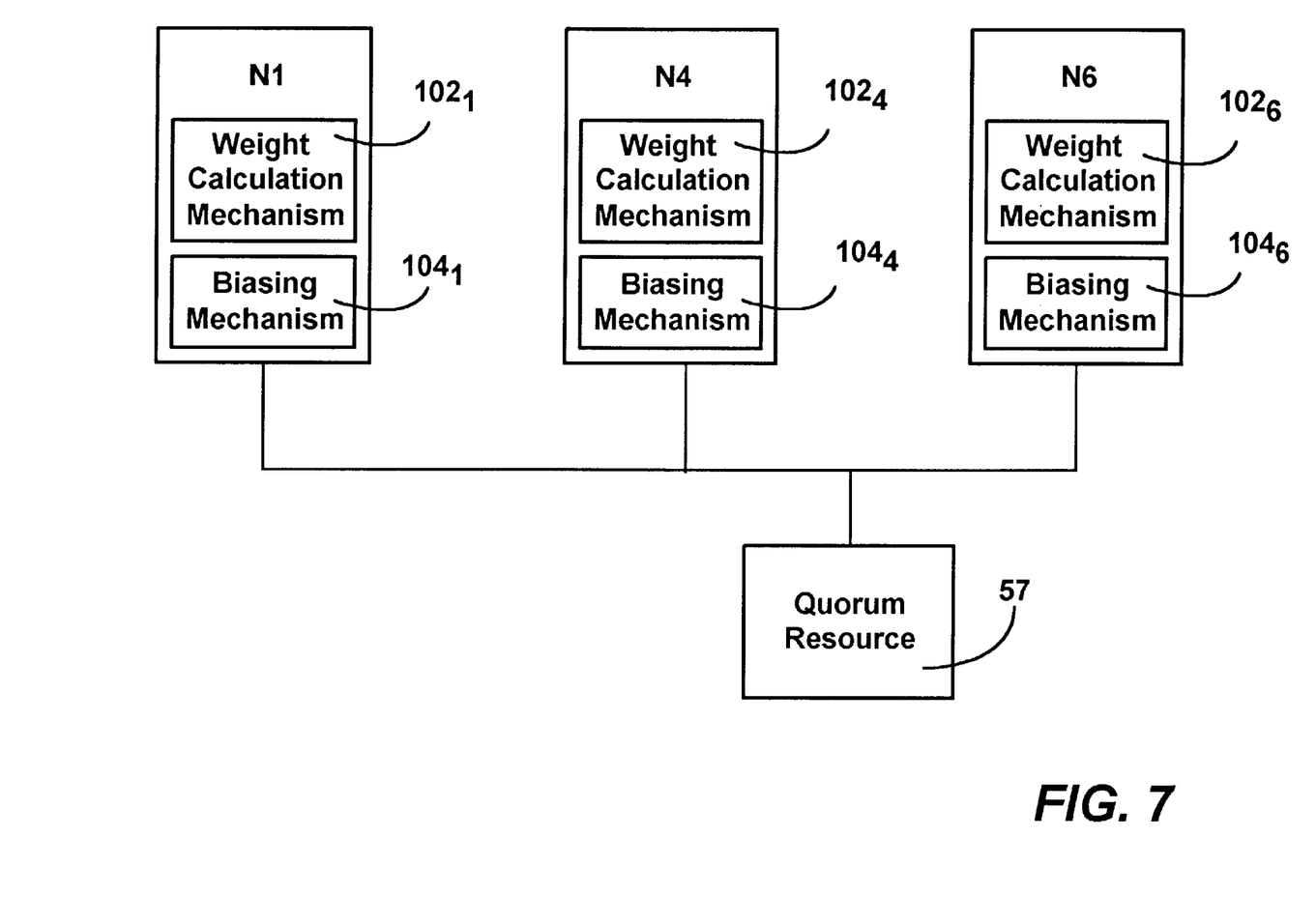
FIG. 7 is a block diagram representing nodes in a server arbitrating for possession of a quorum resource in accordance with one aspect of the present invention.

In the biasing-by-delay implementation, because there is no communication between subgroups, there is no way to know the weight of other subgroups. However, each subgroup does know its weight relative to the original cluster's weight, and can bias its arbitration based on this relative weight. To this end, while a cluster is running (and before the cluster is partitioned), each node records the total weight of the cluster, e.g., in its local storage. Thus, following regroup, the leader node of each subgroup is able to determine the subgroup's relative weight, (e.g., via a weight calculation mechanism 102 as generally represented in FIG. 7).

By way of example, in one implementation, each subgroup's leader node may bias its attempt to secure possession of the quorum resource by delaying for a time duration, before entering arbitration for the quorum resource 57, wherein the time duration is based on the subgroup's relative weight. In one straightforward implementation, the weight is calculated based on the sum of the number of nodes in the subgroup and the total number of nodes in the former cluster. A biasing mechanism 104 in each node then delays arbitration based on the calculated weight. Note that the more nodes a subgroup has, the shorter it delays, since in general, the greater the number of nodes in a subgroup, the stronger a cluster formed therefrom will be in terms of distributing load, availability, reliability and so forth.

One suitable function for determining a biasing factor (e.g., to establish a delay time) in a manner that gives larger subgroups (in terms of the number of nodes therein) an advantage over smaller subgroups is set forth below, where subgroups groups wait F(x,y,z) seconds before attempting to secure possession:

$$F(x,y,z)=\max[0,\text{floor}((x+1)/2)-y]*z$$

where x=the number of active nodes before the regroup, y=the number of survived subgroup nodes after the regroup, and z=the yield time, i.e., a multiplying factor, such as to set the unit of delay time, e.g., to a fraction of a second.

Figure 5:
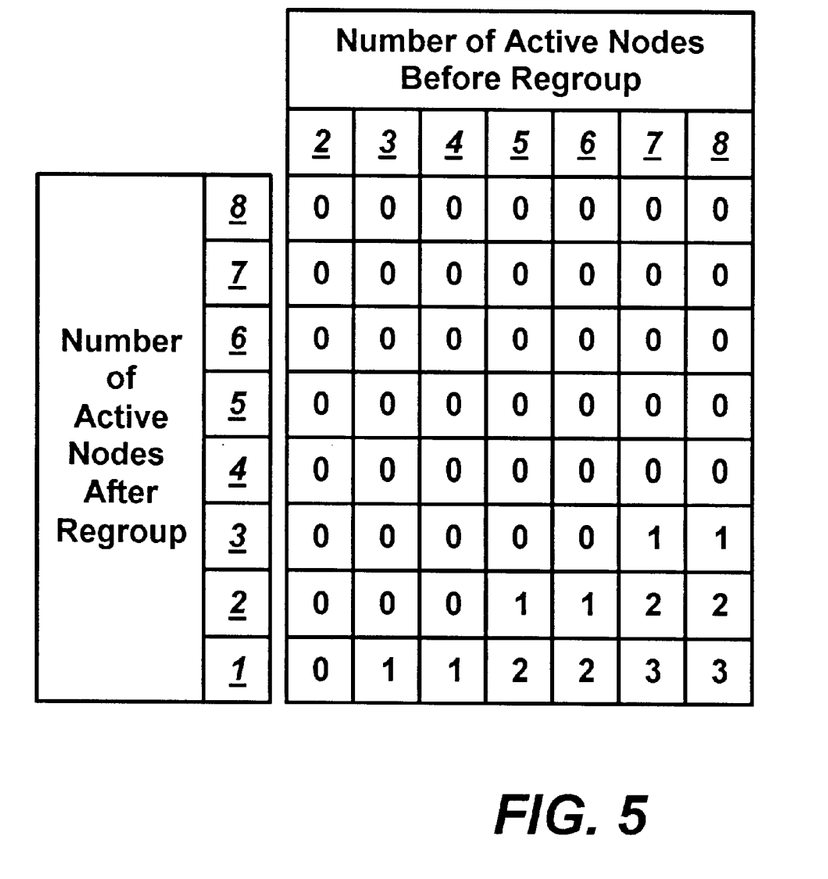
FIG. 5 is a matrix representing factors used by a subgroup to bias its attempt to arbitrate for the quorum resource based on the subgroup's relative weight (e.g., number of nodes), in accordance with one aspect of the present invention.

FIG. 5 provides a matrix showing the results of this function (with z=1) for possible various node counts in a cluster before a regroup with respect to possible various node counts in a subgroup after the regroup. Note that some values shown as zero are actually invalid in practice, i.e., more nodes should not exist in a subgroup after a regroup than before. As can be understood from an analysis of the biasing factor, if a subgroup has half or more of the original cluster nodes, such a subgroup's leader node will not delay in its attempt to gain possession of the quorum resource 57, while any other group will delay for some non-zero time. This gives the larger subgroup the advantage in its attempt to possess the quorum resource 57, which is logical since (if the number of nodes solely determines representation capability) that group will best represent the cluster.

In the example shown in FIG. 4, the subgroup S1 will have the lowest biasing factor based on the function above, since the subgroup S1 has three nodes out of eight original nodes, (equaling a factor of one), while the subgroups S2 and S3 have two nodes (equaling a factor of two). Thus, the subgroup S1 will delay the least amount of time compared to the subgroups S2 and S3, and will thus ordinarily win possession of the quorum resource. As can be appreciated, many other functions may be used to provide a similar result (e.g., delay via a factor of the ratio of the total node count of the original cluster over the subgroup's node count, or via the difference in the counts). However, it is generally desirable to have a function where a guaranteed "best" subgroup is not unfavorably biased at all, (e.g., delays for zero time), and moreover, the biasing of other subgroups' by factors that are integers provides a straightforward solution. Note that the subgroup S1 does not delay for a zero time duration in the example of FIG. 4, because of the possibility that another subgroup (i.e., with four or five nodes of the original eight) may exist and be stronger.

In the event of a tie, (e.g., two subgroups of three nodes exist) the winner of the arbitration will be the one that is (slightly) faster, which is not a problem since both subgroups have the same weight, and (in theory) either will represent the cluster equally. Thus, the yield time (z) in the function should be set to a value that is high enough such that a truly better subgroup has adequate time to gain an arbitration advantage, (i.e., there is a race to arbitrate only in the event of a true tie), yet kept low enough such that there is no unnecessary delay.

Figure 8:
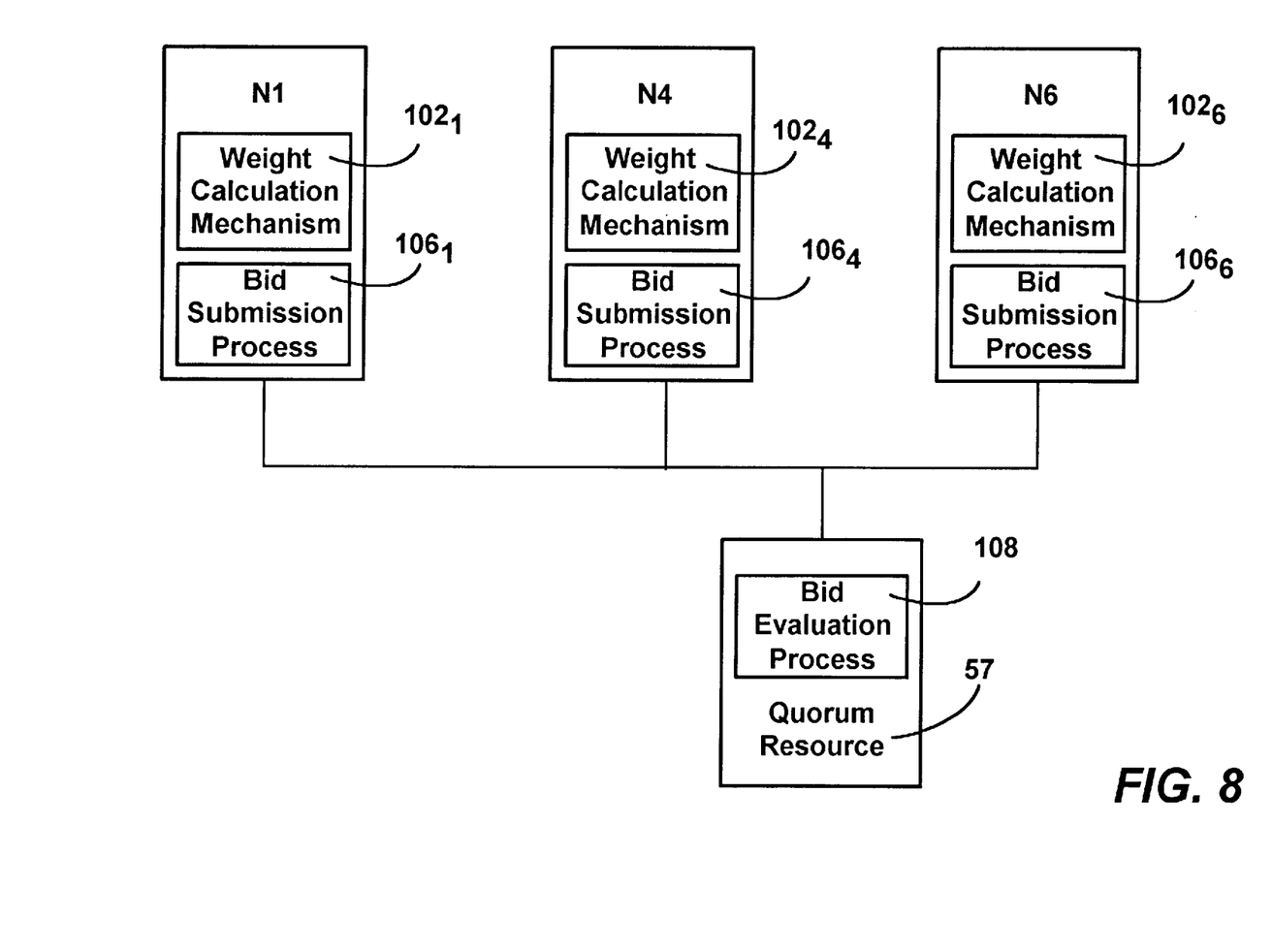
FIG. 8 is a block diagram representing nodes in a server arbitrating for possession of a quorum resource by submitting a bid in accordance with one aspect of the present invention.

In an alternative bid submission/evaluation implementation, instead of delaying before arbitration, the biasing may be accomplished by submitting (e.g., via a bid submission process 106 as generally represented in FIG. 8) a subgroup's weight (or a value based thereon) as a bid to a tie-breaking entity that will determine a winner. Note that to be submitted, the bid needs to be communicated, and thus one suitable tie-breaking entity is built into (or otherwise connected to) the quorum resource 57, e.g., hard-coded (as a bid evaluation process 108) into a processing mechanism therein, since any node capable of representing the cluster needs to be capable of communicating with the quorum resource 57. Thus, for example, the subgroup's leader node may submit the subgroup's number of nodes as a bid to the quorum resource 57, and the quorum resource 57 will accept the best bid as the winner, where the expression "best bid" herein means the most desirable, e.g., the highest or lowest value, depending on how calculated. Note that the weight need not be relative to the original cluster weight, as long as the bids are relative to one another from the perspective of the tie-breaking entity. As used herein, the expression "relative weight" is thus intended to represent both a weight that is relative to the original cluster weight and/or a weight that is relative to other subgroup weights in some way. Further, note that a fixed or variable bidding window of time may be established, e.g., any bids within one second of the first bid will be considered, while others will be too late. One benefit from using the bidding process with a bidding window is that the time needed to determine a winner is independent of how the cluster has been fragmented into subgroups, (in contrast to the above-described biasing-by-delay implementation).

Moreover, note that if the quorum resource 57 receives a clearly "best" bid anytime within the bidding window, the window can be summarily closed and the winner declared immediately. For example, consider a bidding scheme wherein a function similar to the above-described function F(x,y,z) is used, and the lowest submitted bid wins. Various results of F(x,y,z) are shown in FIG. 5, where z=1 (note that z may be unnecessary in the bidding implementation since it is not an actual delay being calculated). In such a scheme, a zero bid is a clearly the "best" bid, and thus the subgroup's node that submitted the bid may be immediately declared the winner. Other functions may similarly result in bids from which the quorum resource can determine a clearly "best" bid.

In another alternative implementation, which may work with the biasing-by-delaying-process, the biasing-by-bidding process, or some other tie-breaking process, criteria in addition to (or instead of) the number of nodes may be used to determine a subgroups' relative weight. For example, a subgroup's current resources relative to the original cluster's total resources, such as the subgroup's non-volatile storage space, processing power, random access memory, and so forth, may be used to compute a relative weight. These criteria need not be given the same weight, and indeed, the weight may vary from time to time based on a particular application. For example, a cluster needed for "number-crunching" applications may be configured to give more weight to processing power, while a cluster needed for storing large amounts of data may be configured give more weight to available non-volatile storage space. Further, a secondary (or even deeper level) tie-breaking scheme may be used, e.g., in the event of a tie in weight using primary criteria, select the subgroup with the best secondary criteria, (although including all criteria together and variably weighting each criterion based on its importance can essentially accomplish this same effect).

The weight-based biasing provided by the present invention thus favors "better" subgroups over lesser "subgroups" in their attempts to arbitrate for the quorum resource. The actual scheme of arbitrating for the quorum resource is thus not significant to the present invention, other than that some scheme be present so that a deserving subgroup may obtain possession of the quorum resource and thereby represent the cluster. Indeed, the arbitration scheme described in the aforementioned U.S. patent application Ser. No. 08/963,050 (i.e., break another's reservation via a SCSI bus reset or equivalent, and delay for a relatively long period of time before trying to reserve exclusive possession from another node that should persist its reservation within a relatively short period of time), is one suitable manner of arbitrating for possession of the quorum resource in a two-node cluster. In a cluster of more than two nodes, an arbitration scheme may be provided via a SCSI bus reset or equivalent that breaks a reservation on the quorum resource, along with a modified fast mutual exclusion algorithm in combination with a reserve command (e.g., SCSI)to determine a winner, as described in the aforementioned U.S. patent application Ser. No. 09/277,450. Moreover, the above-described bid-submission scheme provides another suitable way of arbitrating for possession of the quorum resource.

In the example shown in FIG. 4, the quorum resource 57 is not exclusively possessed by any operational node because the node N8 that formerly possessed it has failed and cannot defend its possession. In such a situation, a new subgroup ordinarily will be able to obtain possession of the quorum resource 57. However, after other regroup events, the cluster resource 57 may continue to be possessed by an operational node. By way of example, consider a partitioning situation similar to that represented in FIG. 4, but in which the node N8 does not fail. In such an event, the node N8 may continue to represent the cluster by defending its possession of the quorum resource, e.g., by periodically persisting its reservation and thereby winning the arbitration. However, in an alternate implementation, following a regroup event, a node that possesses the quorum resource may determine that its subgroup is likely to be weaker than another subgroup, e.g., the node N8 is the only node in its subgroup S4. In such an event, the node N8 may voluntarily relinquish its possession, and bias its attempt (delay) to re-secure possession of the quorum resource in order to give other possible subgroups an appropriately biased opportunity to secure possession. Note that in the above-described bidding scheme, the tie-breaking mechanism itself may take away a node's possession and give it to another node.

Figure 6:
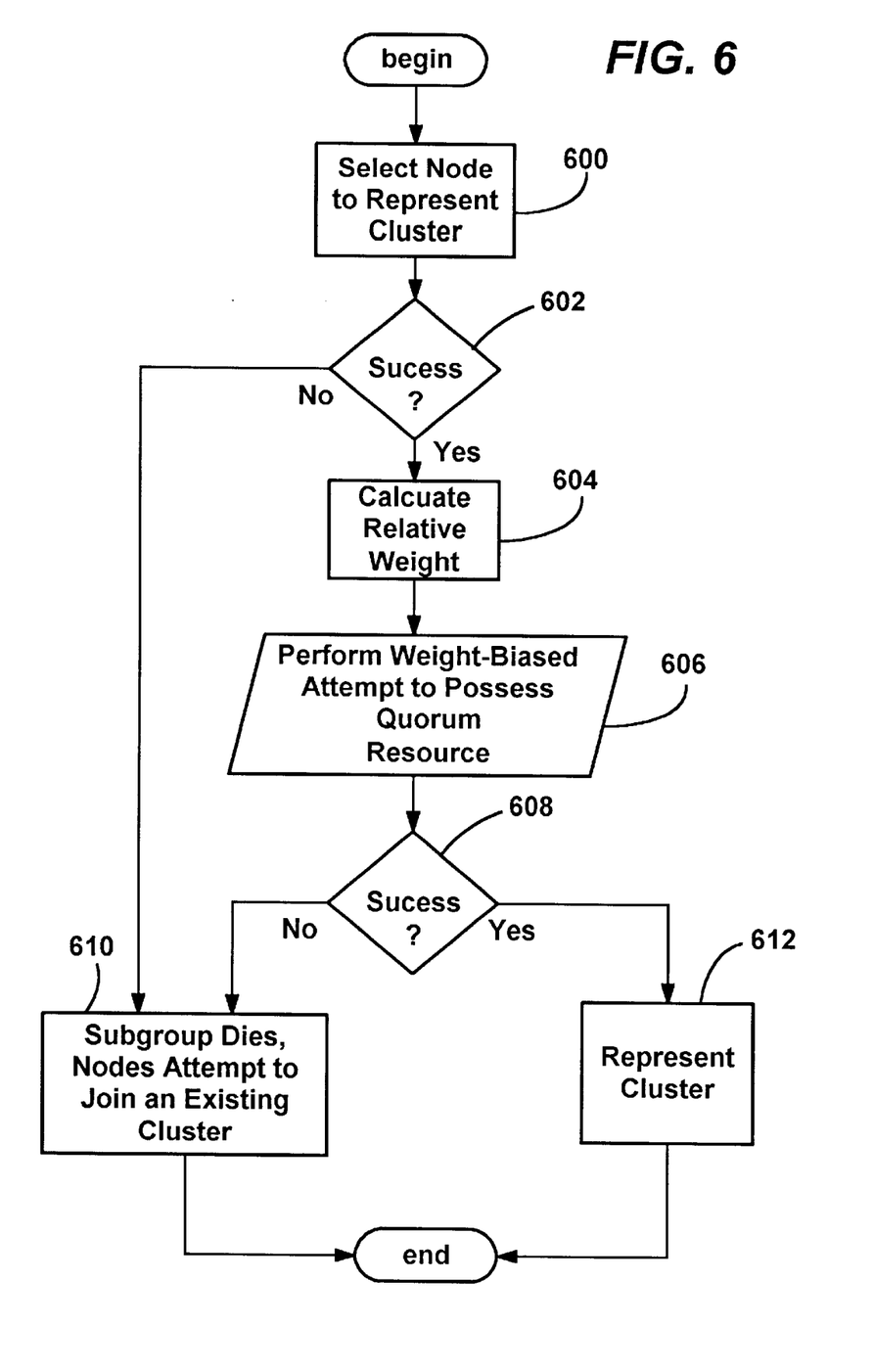
FIG. 6 is a flow diagram representing the general process for biasing an attempt to possess the quorum resource based on the subgroup's relative weight in accordance with one aspect of the present invention.

FIG. 6 generally summarizes the subgroup selection mechanism of the present invention, beginning at step 600 wherein a subgroup tries to select a node that will attempt to secure possession of the quorum resource so that the subgroup can represent the cluster. If the subgroup does not have a node therein capable of securing possession, the subgroup branches to step 610, which represents the subgroup halting operation, after which the nodes thereof may attempt to rejoin an existing cluster.

If at step 602 a leader node was determined, step 602 branches to step 604 where leader node (or some other resource in the subgroup) calculates the relative weight of the subgroup, such as by counting the number of nodes and/or other resources in the subgroup and/or executing a function as described above. Step 606 represents the weight-biased attempt to obtain possession of the quorum resource 57, such as by first delaying before arbitrating, or submitting a bid as also described above.

If the arbitration fails, step 608 branches to step 610 where the subgroup halts operation, after which its nodes may attempt to join an existing cluster. If instead the arbitration is successful, the subgroup may now establish (or continue) and represent a fully operational cluster, which other nodes may then join.

As can be seen from the foregoing detailed description, there is provided a method and system in which only one subgroup survives to represent a cluster, and wherein a weightier subgroup is favored over lesser-weighted subgroups in determining representation of the cluster. The method and system are capable of operating when subgroups are unable to communicate with each other, and without requiring a subgroup to have a majority of nodes therein in order to represent the cluster.

While the invention is susceptible to various modifications and alternative constructions, certain illustrated embodiments thereof are shown in the drawings and has been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-readable medium having computer-executable instructions, comprising:

determining at a subgroup of nodes a relative weight of the subgroup; and attempting by the subgroup to represent a cluster by obtaining exclusive possession of a quorum resource, the attempt biased by the relative weight of the subgroup, wherein the relative weight of the subgroup is based on a subgroup weight and a weight of a former cluster to which the subgroup belonged.

2. The computer-readable medium of claim 1 wherein the subgroup elects a node as a leader node.

3. The computer-readable medium of claim 1 wherein the relative weight includes a count of the number of nodes in the subgroup.

4. The computer-readable medium of claim 1 wherein the relative weight is determined by a plurality of criteria including a calculation of resources in the subgroup.

5. The computer-readable medium of claim 1 wherein the attempt is biased by delaying arbitration for the quorum resource for a time duration based on the relative weight of the subgroup.

6. The computer-readable medium of claim 5 wherein the time duration is approximately zero if the relative weight is greater than or equal to half of a weight of a former cluster to which the subgroup belonged.

7. The computer-readable medium of claim 5 wherein the relative weight includes a count of the number of nodes in the subgroup.

8. The computer-readable medium of claim 1 wherein the attempt is biased by submitting a bid to a tie-breaking entity, the bid corresponding to the relative weight of the subgroup.

9. The computer-readable medium of claim 8 wherein the tie-breaking entity receives bids within a window of time.

10. The computer-readable medium of claim 8 wherein the relative weight includes a count of the number of nodes in the subgroup.

11. The computer-readable medium of claim 8 wherein the relative weight is determined by a plurality of criteria including a calculation of resources in the subgroup.

12. The computer-readable medium of claim 8 wherein the subgroup elects a node as a leader node.

13. A method for selecting a subgroup to represent a cluster, comprising:

providing a quorum resource, wherein exclusive possession of the quorum resource by a node determines representation of the cluster;

receiving a bid from a plurality of nodes, each node of a distinct subgroup and each bid corresponding to a relative weight of the subgroup of each node; and granting possession of the quorum resource to the node having the best bid.

14. The method of claim 13 wherein each bid is received within a window of time.

15. The method of claim 13 wherein at least part of each bid is based on a count of the number of nodes in each subgroup.

16. The method of claim 13 wherein each bid is based on a plurality of criteria including a calculation of resources in each subgroup.

17. The method of claim 13 wherein each subgroup elects a node as a leader node.

18. A system for determining representation of a cluster among non-communicating subgroups via an arbitration process, comprising:

a quorum resource, wherein exclusive possession of the quorum resource by a node determines representation of the cluster;

a calculation mechanism in at least one node of each subgroup for determining a relative weight thereof; and a biasing mechanism for favoring subgroups having a better relative weight in the arbitration process over subgroups having a lesser relative weight.

19. The system of claim 18 wherein the biasing mechanism comprises a time delay process.

20. The system of claim 18 wherein the biasing mechanism comprises a bid submission and evaluation process.

21. The system of claim 20 wherein the evaluation process includes a bidding window.

22. The system of claim 21 wherein the bidding window is fixed.

23. The system of claim 21 wherein the bidding window is variable.

24. The system of claim 21 wherein the bidding window is terminated before its natural expiration when the evaluation process determines a clearly best bid.

25. A computer-readable medium having computer executable instructions for performing the method of claim 13.

* * * * *